United States Patent Office.

R. M. RUSSELL, OF NEW YORK, N. Y., ASSIGNOR TO GEORGE W. NORRIS, OF BALTIMORE, MARYLAND.

*Letters Patent No. 67,455, dated August 6, 1867.*

---

IMPROVEMENT IN DISINTEGRATING FLAX, HEMP, AND OTHER FIBROUS PLANTS.

---

*The Schedule referred to in these Letters Patent and making part of the same.*

---

TO ALL WHOM IT MAY CONCERN:

Be it known that I, R. M. RUSSELL, of the city of New York, in the county and State of New York, have invented certain new and useful improvements in the Treatment of the Flax Plant, Hemp Plant, Maize or Indian-Corn Plant, and all fibrous vegetable plants or matter, for the purpose of extracting therefrom the fibre and other component parts thereof; and I do hereby declare that the following is a full, clear, and exact description thereof.

My invention or process consists in subjecting the fibrous matter to the action of dry or superheated steam, in connection with the action of carbonic acid gas, either separately or combined with atmospheric air, delivered under pressure, and used in combination with chemically prepared solutions.

The plants or fibrous matters to be operated upon are placed in a boiler, either stationary or revolving, with a suitable furnace underneath for fire, and having all the necessary connections with a compressed-air receiver, a reservoir for carbonic acid gas, solution-tanks, &c., and provided with proper stop-valves or cocks on each separate inlet, also outlet-valves and safety-valves, and to be erected in suitable relation to a steam-generating boiler or apparatus.

The air-vessel or receiver is to be filled by any of the usual appliances for compressing air, and to be supplied with artificial means for cooling its contents when under pressure, or time allowed for the radiation of the surplus heat caused by such compression, in order to take advantage of the known fact that compressed air, when suddenly released and expanded to the normal pressure of the atmosphere, becomes greatly reduced in temperature. Carbonic acid gas is to be treated in a similar manner, and its properties of creating cold under sudden expansion are known to be much greater than air. Advantage is taken of this fact to mix the two in suitable proportions before admission or during their passage from their respective receivers to the boiler containing the fibrous vegetable plants or matter under treatment. The introduction of air or gas, or both combined, to the saturated contents of the boiler, to create cold, is an essential feature in the process.

The operation of disintegration is thus to be performed: The fibrous plants or matters to be operated upon are placed in a boiler or disintegrating vessel, and steam or superheated steam is then to be admitted and passed through the same and its contents, the said steam passing out through an outlet-valve and carrying with it all the air contained in the boiler, and expelling the air also in a great measure from the fibrous vegetable contents. Partial condensation will ensue and fill the pores with moisture. The outlet-valve is then to be closed and the heat from the steam dry steam continued for the necessary period required by the special plants or matter under operation. The time of this will vary from forty to sixty minutes. The dry steam is then to be shut off, and the communication between the boiler and air and carbonic acid gas-receiver or receivers opened. The cold produced by the sudden admission and expansion of this air and gas will condense the remaining steam in the boiler and thus relieve the pressure on the pores or cells, and the latent heat contained in the moisture in these pores or cells will cause steam to be generated from this moisture, and thereby disintegrate the fibrous plants or matter in the boiler instantly, leaving it in the best state for further chemical agents or chemically prepared solutions. The chemical agents employed may be used as simples, or combined in solutions, the quantity of each employed of course varying according to the substances under treatment.

It will be generally found that for each one hundred pounds of matter to be thus operated upon there will be required from three to five per cent. of lime, four to six per cent. of soda, and two to three per cent. of salt, to which water must be added, forming a solution sufficient in quantity to cover the matter in the boiler or disintegrating vessel. In some cases crude petroleum to the extent of two per cent. may be used advantageously, and also sulphuric acid to the extent of four per cent., when a partially bleached product is required. The time required for this operation will vary from four (4) to six (6) hours. The fibrous mass may be subjected to the action of the chemical agents either in the boiler or in some other vessel into which they have been placed after removal from the boiler; and they may be placed in the boiler before the fibrous plants have been subjected to the action of the steam or superheated steam, or may be placed therein during or after that part of the process, or they may be introduced therein at the same time the atmospheric air or carbonic acid gas, or both combined, are admitted; or, indeed, they may be introduced with the steam; for instance, steam may be generated from a liquid in which the chemical agents are held in suspension. I do not, therefore, limit myself to any specific time during the process for the introduction of the chemicals, or to any specific time when the fibrous substances are to be subjected to the action of the chemical agents.

Whilst the fibrous vegetable contents of the boiler are being treated with the above solution they should be kept in agitation. The process completed, it will be found that the fibrous portion of the mass has been separated from the other component parts thereof. The fibre is then washed and dried, and is valuable for the manufacture of textile materials, cordage, &c., and can be used for all purposes where any description of fibre produced by other processes is used, and is also valuable for the manufacture of paper stock. The other component parts of the fibrous plants separated by this process are composed of pulp and gluten, both being valuable articles of commerce.

I will here state that I am aware of a process for disintegrating fibrous substances, particularly wood, in which steam is employed for expanding the pores of the fibrous substance, which substance, after having been subjected to the action of steam, is suddenly "projected" or expelled into the atmosphere, which action, it is alleged, produces a more thorough disintegration. I wish it understood that I do not claim the employment of steam for disintegrating purposes, as I believe the same is old; but I claim my process substantially as herein specified, which, in brief, consists in first subjecting the fibrous substance whilst in the boiler or other vessel to the action of steam or superheated steam, by which the mass is softened and the pores expanded by the steam permeating through the same, and then subjecting it to the action of cold atmospheric air or carbonic acid gas, or the two together, the one action following the other. This produces a substantial disintegration. The chemical treatment may be commenced after this substantial disintegration, or before it, or whilst it is going on

What I claim as my invention, and desire to secure by Letters Patent, is—

1. The process of disintegrating fibrous substances substantially as herein specified, that is to say, by subjecting the said substances, whilst in a boiler or other suitable vessel, to the action of steam or superheated steam, followed by cold atmospheric air or carbonic acid gas, or both together, producing results substantially as herein specified.

2. Treating the substantially disintegrated mass, whilst in the disintegrating boiler or other vessel, with the chemical agents herein specified, or their equivalents, in substantially the manner herein specified.

R. M. RUSSELL.

Witnesses:
M. M. LIVINGSTON,
T. B. BEECHER.